(12) United States Patent
Williams et al.

(10) Patent No.: US 7,126,242 B2
(45) Date of Patent: *Oct. 24, 2006

(54) ELECTRIC MOTOR ASSEMBLY

(75) Inventors: Robert B. Williams, Baltimore, MD (US); Robert J. Marcinkowski, Cockeysville, MD (US); Earl M. Ortt, Bel Air, MD (US); Bradley J. Mealy, Abingdon, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/118,918

(22) Filed: Apr. 29, 2005

(65) Prior Publication Data

US 2005/0184608 A1 Aug. 25, 2005

Related U.S. Application Data

(63) Continuation of application No. PCT/US03/33573, filed on Oct. 22, 2003, which is a continuation of application No. 10/286,935, filed on Oct. 31, 2002, now Pat. No. 6,713,916.

(51) Int. Cl.
*H02K 5/00* (2006.01)

(52) U.S. Cl. .......................................... 310/89; 310/239

(58) Field of Classification Search ................. 310/47, 310/50, 58–59, 60 R, 60 A, 61–62, 89, 43
See application file for complete search history.

(56) References Cited

U.S. PATENT DOCUMENTS

| | | | |
|---|---|---|---|
| 2,016,173 A | 10/1935 | McNeil | |
| 2,179,279 A | 11/1939 | Brecht | |
| 2,814,096 A | 11/1957 | Herbrecht | |
| 3,143,897 A | 8/1964 | Kohn | |
| 3,177,388 A | 4/1965 | Cook | |
| 3,290,524 A | 12/1966 | Maffey, Jr. | |
| 3,322,331 A | 5/1967 | Kenny et al. | |
| 3,350,586 A | 10/1967 | Otto | |
| 3,617,786 A | 11/1971 | Stielper | |
| 3,663,914 A | 5/1972 | Lane | |

(Continued)

FOREIGN PATENT DOCUMENTS

DE 219374 11/1908

(Continued)

OTHER PUBLICATIONS

International Search Report PCT /US 03/33573 dated Mar. 15, 2004.

(Continued)

*Primary Examiner*—Thanh Lam
(74) *Attorney, Agent, or Firm*—Harness, Dickey & Pierce, P.L.C.

(57) ABSTRACT

A field case housing has a substantially cylindrical wall segment, an end segment and a flange all having a substantially constant wall thickness. The flange has reinforcing ribs connected to the wall segment and aperture reinforcing bosses. The end segment, the wall segment and the flange are formed as a single, integral part adapted to reduce warping of the housing during molding. A cylindrical guide member is located in the field case housing and a conical guide member is located in the fan baffle. The cylindrical guide member is adapted to insure a screw passing through the cylindrical guide member is guided to a point within the conical guide member. The fan baffle has a transverse wall with an aperture and guide walls extending adjacent the aperture. The guide walls are adapted to guide an armature past the magnets without contacting and damaging them.

20 Claims, 8 Drawing Sheets

U.S. PATENT DOCUMENTS

| | | | |
|---|---|---|---|
| 3,760,209 A | 9/1973 | Hult | |
| 3,784,856 A | 1/1974 | Preston | |
| 4,015,154 A | 3/1977 | Tanaka et al. | |
| 4,039,871 A | 8/1977 | Yamashita et al. | |
| 4,071,788 A | 1/1978 | Martin et al. | |
| 4,082,972 A | 4/1978 | Gerber et al. | |
| 4,134,036 A | 1/1979 | Curtiss | |
| 4,342,929 A | 8/1982 | Horne | |
| 4,354,128 A | 10/1982 | Chew et al. | |
| 4,366,403 A | 12/1982 | Simpson et al. | |
| 4,498,230 A | 2/1985 | Harris et al. | |
| 4,559,465 A | 12/1985 | Gagneux | |
| 4,593,220 A | 6/1986 | Cousins et al. | |
| 4,698,534 A | 10/1987 | Smith et al. | |
| 4,720,646 A | 1/1988 | Torimoto | |
| 4,748,739 A | 6/1988 | Muradliyan | |
| 4,801,833 A | 1/1989 | Dye | |
| 4,818,911 A | 4/1989 | Taguchi et al. | |
| 4,851,729 A | 7/1989 | Baines | |
| 4,853,566 A | 8/1989 | Dinkelmann et al. | |
| 4,866,322 A | 9/1989 | Baumeister et al. | |
| 4,891,539 A | 1/1990 | Okamoto et al. | |
| 4,896,067 A | 1/1990 | Walther | |
| 4,908,538 A | 3/1990 | Geberth, Jr. | |
| 4,933,582 A | 6/1990 | Hata et al. | |
| 4,953,284 A | 9/1990 | Hammer et al. | |
| 4,955,128 A | 9/1990 | Sogabe et al. | |
| 5,268,607 A | 12/1993 | McManus | |
| 5,296,769 A | 3/1994 | Havens et al. | |
| 5,329,198 A | 7/1994 | Schmidt et al. | |
| 5,487,213 A | 1/1996 | Hult et al. | |
| 5,584,114 A | 12/1996 | McManus | |
| 5,631,513 A | 5/1997 | Coles et al. | |
| 5,650,676 A | 7/1997 | Blumenberg | |
| 5,675,204 A | 10/1997 | Kusumoto et al. | |
| 5,714,819 A | 2/1998 | Gilliland et al. | |
| 5,717,272 A | 2/1998 | Gobled | |
| 5,767,596 A | 6/1998 | Stark et al. | |
| 5,780,946 A | 7/1998 | Nakamura et al. | |
| 5,786,647 A | 7/1998 | Vollmer et al. | |
| 5,793,141 A | 8/1998 | Simonsen et al. | |
| 5,895,207 A | 4/1999 | Burgdorf et al. | |
| 6,025,661 A | 2/2000 | Chang | |
| 6,031,313 A | 2/2000 | Sugai et al. | |
| 6,037,688 A | 3/2000 | Gilliland et al. | |
| 6,045,112 A | 4/2000 | Kirkwood | |
| 6,069,423 A | 5/2000 | Miller et al. | |
| 6,087,754 A | 7/2000 | Berger | |
| 6,124,652 A | 9/2000 | Karasa et al. | |
| 6,133,665 A | 10/2000 | Prell et al. | |
| 6,177,751 B1 | 1/2001 | Suzuki et al. | |
| 6,204,582 B1 | 3/2001 | Keller et al. | |
| 6,329,730 B1 | 12/2001 | Neckermann et al. | |
| 6,417,595 B1 | 7/2002 | Wasson | |
| 6,472,785 B1 | 10/2002 | Petit et al. | |
| 6,518,686 B1 | 2/2003 | Campbell et al. | |
| 6,713,916 B1 * | 3/2004 | Williams et al. | 310/89 |
| 6,798,109 B1 | 9/2004 | Ortt et al. | |
| 6,858,957 B1 | 2/2005 | Ortt et al. | |
| 2001/0026105 A1 | 10/2001 | Torii et al. | |
| 2004/0169435 A1 | 9/2004 | Winkler et al. | |

FOREIGN PATENT DOCUMENTS

| | | |
|---|---|---|
| DE | 2432204 C2 | 2/1975 |
| DE | 2649181 A1 | 5/1976 |
| DE | 8025424 U | 9/1980 |
| DE | 9102340.8 U | 5/1992 |
| DE | 19602173 | 1/1996 |
| DE | 29702603 U | 2/1997 |
| DE | 19650245 A1 | 6/1998 |
| DE | 19951861 A1 | 5/2000 |
| DE | 10065281 A1 | 7/2002 |
| DE | 10118275 A1 | 10/2002 |
| EP | 0074068 B1 | 3/1983 |
| EP | 0302116 A1 | 2/1989 |
| EP | 0397973 B1 | 11/1990 |
| EP | 0048988 B1 | 1/1991 |
| EP | 0410933 B1 | 1/1991 |
| EP | 0488260 | 11/1991 |
| EP | 0784369 B1 | 7/1997 |
| EP | 0851541 B1 | 1/1998 |
| EP | 0935318 A2 | 8/1999 |
| FR | 2118232 | 12/1970 |
| GB | 1278294 | 6/1972 |
| GB | 2367193 A | 3/2002 |
| SU | 964817 A | 10/1982 |
| WO | WO00/76053 | 6/2000 |
| WO | WO01/99256 | 6/2001 |
| WO | WO02/054541 A1 | 7/2002 |

OTHER PUBLICATIONS

International Search Report PCT/US 03/33573 dated Jun. 1, 2004.

* cited by examiner

ELECTRIC MOTOR ASSEMBLY

CROSS-REFERENCE TO RELATED APPLICATIONS

This application is a Continuation of International Application No. PCT/US2003/033573, filed Oct. 22, 2003 and designating the United States. This application claims the benefit which is a Continuation of U.S. application Ser. No. 10/286,935, filed on Oct. 31, 2002, now U.S. Pat. No. 6,713,916. The disclosures of the above applications are incorporated herein by reference.

FIELD OF THE INVENTION

The present invention relates to electric motors; and more particularly, to the field case housing and/or fan baffle of electric motors.

BACKGROUND OF THE INVENTION

Electric motors are used in a variety of applications, including power tools. Such electric motors typically include a motor shaft, a motor armature, magnets, a fan baffle, a commutator assembly, brush holders and electrical leads. The electrical leads selectively link brushes to a power source. The motor armature is fixed for rotation with the motor shaft and a series of copper conducting wires are wound in various patterns about peripheral slots. Ends of the wires are fused to the commutator. The commutator is fixed for rotation with the motor shaft and provides an electrical connection between the rotating armature and the stationary brushes.

These components are generally housed within a field case housing. Performance is improved by accurately locating the armature and magnets with respect to each other within the field case housing. Consequently, it is desirable to form the housing so that warping during the injection molding process of the housing is reduced. It is also desirable to locate the armature and magnet into their close proximity without the armature impacting upon and damaging the magnets during assembly. Additionally, it is desirable that the assembly process be facilitated by guiding screws from insertion apertures to receiving apertures without being drawn off course by the effects of the magnets. One or more of these, as well as other desirable features, may be selectively accomplished by using various aspects of the present invention.

SUMMARY OF THE INVENTION

In accordance with one aspect of the present invention an electric motor assembly including a field case housing and an end plate is provided. The field case housing has a substantially cylindrical wall segment, an end segment and a flange all having a substantially constant wall thickness. The flange having a plurality of flange reinforcing ribs connected to the wall segment and having a plurality of apertures through which attachment members connect the housing to the end plate and having reinforcing bosses around the plurality of apertures. The end plate is adapted to cover the open end of the housing attached to the flange. The end segment, the wall segment and the flange are molded as a single, integral part and the plurality of flange stabilizing ribs, the plurality of end segment stabilizing ribs and the substantially constant thickness is adapted to reduce warping of the housing during a molding process.

In accordance with another aspect of the present invention an electric motor assembly is provided. The assembly has a cylindrical guide member associated with a screw insertion aperture having a diameter and located in a field case housing or a fan baffle. A conical guide member is associated with a screw receiving aperture in the other of the field case housing and the fan baffle. The conical guide member has a distal end which is larger than a diameter of the screw insertion aperture. At least one magnet is located between the cylindrical guide member and the conical guide member which exerts a magnetic force on a screw passing from the cylindrical guide member to the conical guide member. The cylindrical guide member is adapted to insure a tip of a screw passing through the cylindrical guide member is guided to a point within the diameter of the conical guide member.

In accordance with yet another aspect of the present invention, an electric motor assembly with field case housing and oppositely disposed motor magnets associated with the housing is provided. A fan baffle is associated with the housing adjacent the oppositely disposed magnets. The fan baffle has a transverse wall with an aperture therethrough and at least one guide wall extending from the transverse wall adjacent the aperture. The at least one guide wall is adapted to guide an armature past the oppositely disposed magnets without contacting and damaging one of the oppositely disposed motor magnets.

In accordance with another aspect of the present invention, an electric motor assembly having a motor magnet assembly and a fan baffle adjacent thereto is provided. The fan baffle has a transverse wall with an aperture therethrough and at least one guide wall extending from the transverse wall adjacent the aperture. The at least one guide wall is adapted to guide the armature past the motor magnet assembly. The fan baffle also has a cylindrical guide member associated with a screw insertion aperture or a conical guide member associated with a screw receiving aperture, where the conical guide member has a diameter at its distal end which is larger than a diameter of the screw insertion aperture. A field case housing is associated with the motor magnet assembly and the fan baffle. The field case housing has the other of the cylindrical guide member or the conical guide member. The cylindrical guide member is adapted to cause a tip of a screw passing through the cylindrical guide member to be guided to a point within the diameter of the conical guide member.

Further areas of applicability of various aspects of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For example, although the motor is illustrated and discussed herein in terms of its use in association with a power tool, the motor may also be used for various other applications.

Figure 1:
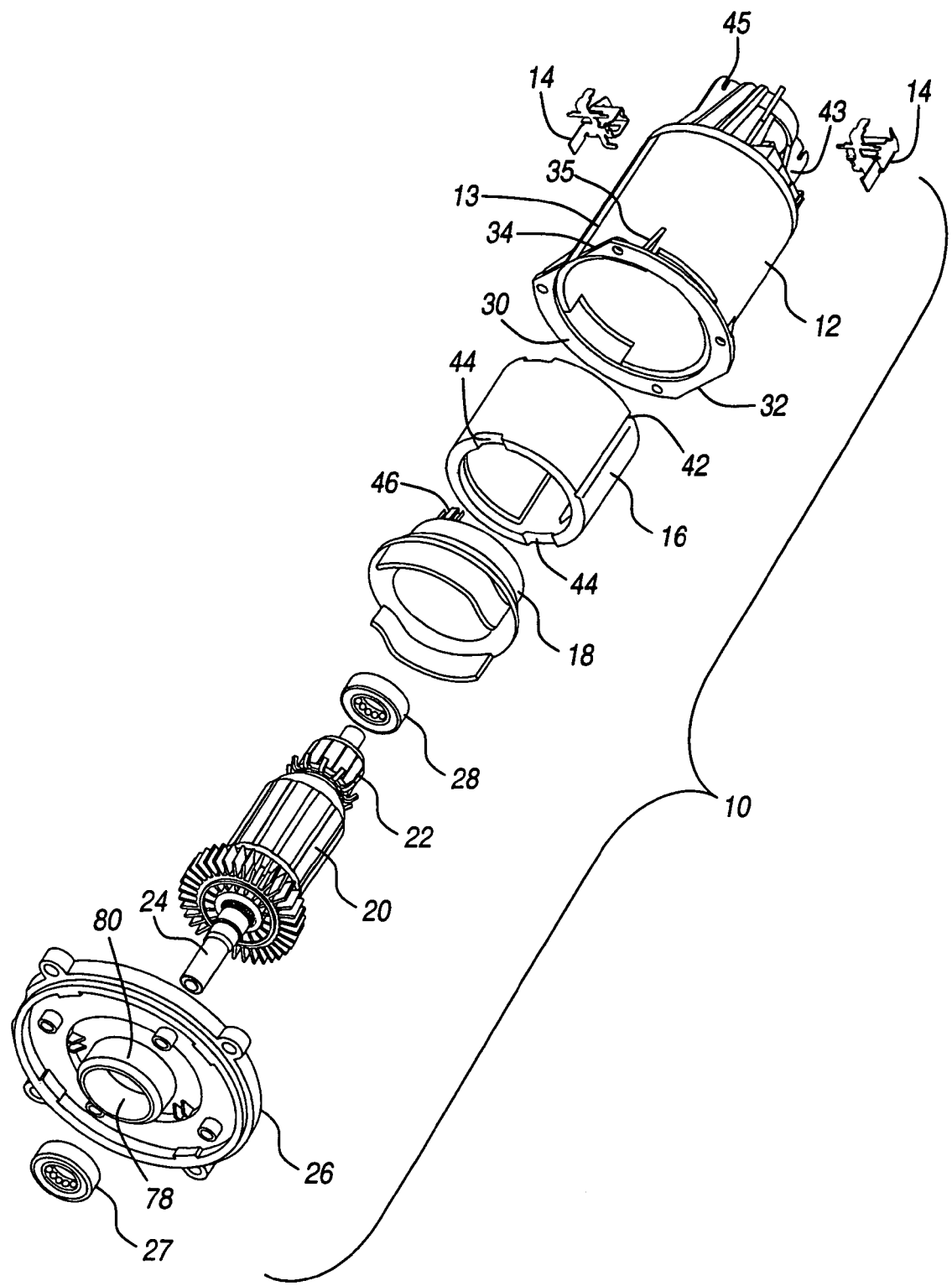
FIG. 1 is an expanded perspective view of a preferred motor assembly according to the present invention.

Referring to FIG. 1, a preferred embodiment of a motor 10 according to the present invention is illustrated. Motor 10 includes a field case housing 12, brush assemblies 14, motor can 16, baffle 18, armature 20, commutator 22, shaft 24, end plate 26 and front 27 and rear 28 bearings. Housing 12 is preferably molded as a single, integral part and includes a generally cylindrical flange 30. Flange 30, however, includes a shorter, elongated, linear, straight edge 32 (or short flat spot) and a longer, elongated, linear, straight edge 34 (or long flat spot).

Figure 2:
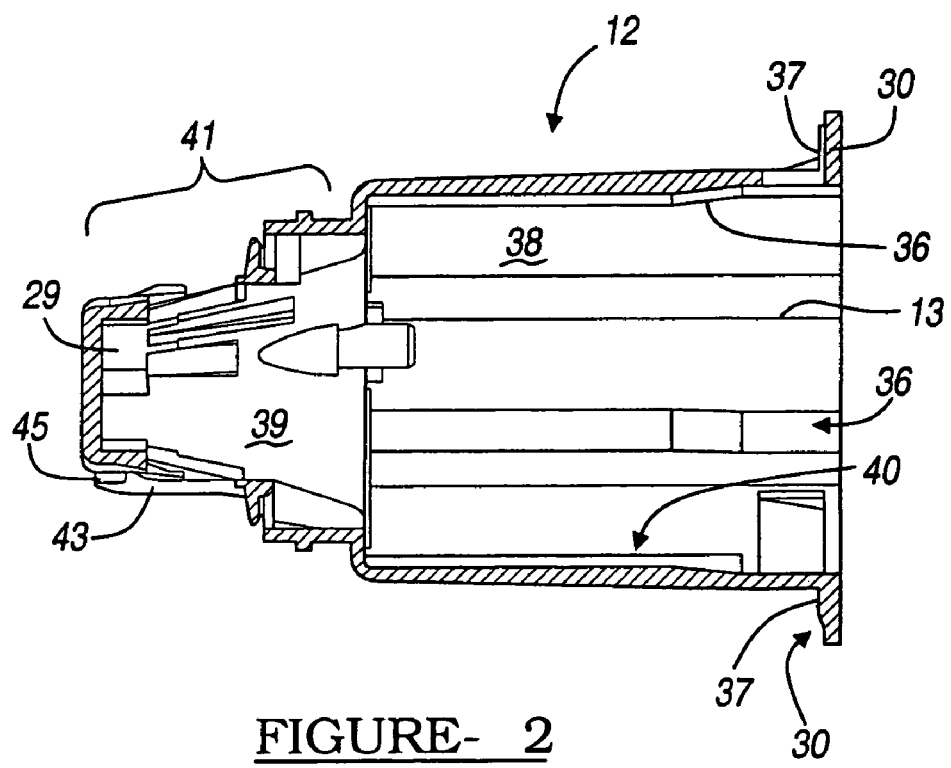
FIG. 2 is a cross-sectional view of the field case housing of FIG. 1.

Referring to FIG. 1 and FIG. 2, field case housing 12 is a generally tubular body. In molding housing 12, it is desirable to reduce warping during cooling of the thermoplastic material. This facilitates proper motor can 16 alignment with bearing 28 (and in turn, with shaft 24 and armature 20). Housing 12, therefore, has walls with a substantially constant thickness wherever possible. For example, housing 12 includes a corresponding flat spot 13 aligned with longer flat spot 34 of flange 30. The inside of housing 12 also has the corresponding flat spot 13 to maintain the constant wall thickness. Preferably, the substantially constant wall thickness varies by less than about fifteen percent; and more preferably, by less than about five percent. Further, it is preferred that field case housing 12 has the substantially constant wall thickness over at least about 85 percent of its (in this case excluding the thickened bosses on the flange, the locating ribs, and the conical screw insertion segment) surface area; more preferably, at least about 90 percent; and even more preferably, at least about 95 percent.

In order to strengthen the flange 30, a series of radially-aligned flange reinforcing ribs 35 (seen best in FIG. 6) are located between flange 30 and the adjacent wall segment of housing 12. In addition, flange 30 includes thickened reinforcing bosses 37 (seen best in FIG. 6) around the plurality of apertures 39 which are used in attaching flange 30 of field case housing 12 to end plate 26. At the end of housing 12 opposite flange 30, a conical end segment 41 is provided.

The inner surface 39 of the end segment 41 has a conical shape leading to a rear bearing cavity 29 adapted to receive and retain rear bearing 28. The walls at the distal end of the conical segment are slightly thickened to provide support for rear bearing 28. A series of radially-aligned end segment reinforcing ribs 43 are also included. In addition, several of radially-aligned end segment stabilizer ribs 43 include a slot 45 which provides a wire trap adapted to retain an electrical wire. It is preferred that flange reinforcing ribs 35 and end segment reinforcing ribs 43 have a thickness corresponding to about 75% of the substantially constant wall thickness.

Inner surface 38 of housing 12 has a plurality of arcuate ribs 36 which are molded to precise dimensions to accurately align motor can 16 about a central axis of housing 12. The precision is provided by first creating the mold from which housing 12 is made with small arcuate ribs 36 and iteratively increasing the thickness of the ribs 36 based upon molding results, thereby accounting for any warping during injection molding. Ribs 36 are arcuate in that they match the outer curvature of motor can 16. The end of arcuate ribs 36 near the open end of the housing 12 are of a different thickness. This thickness, however, has also been iteratively increased to cooperate with a member 64 (seen in FIG. 4) of end plate 26 to accurately locate housing 12 and end plate 26 coaxially relative to each other. At its greatest dimension, the overall wall thickness of housing 12 at the arcuate alignment rib 36 is preferably less than about two times the substantially constant wall thickness; and more preferably, less than about 1.5 times. Inner surface 38 also includes an alignment rib 40 which cooperates with a corresponding alignment recess 42 on motor can 16 to rotationally align motor can 16 within housing 12.

Figure 3:
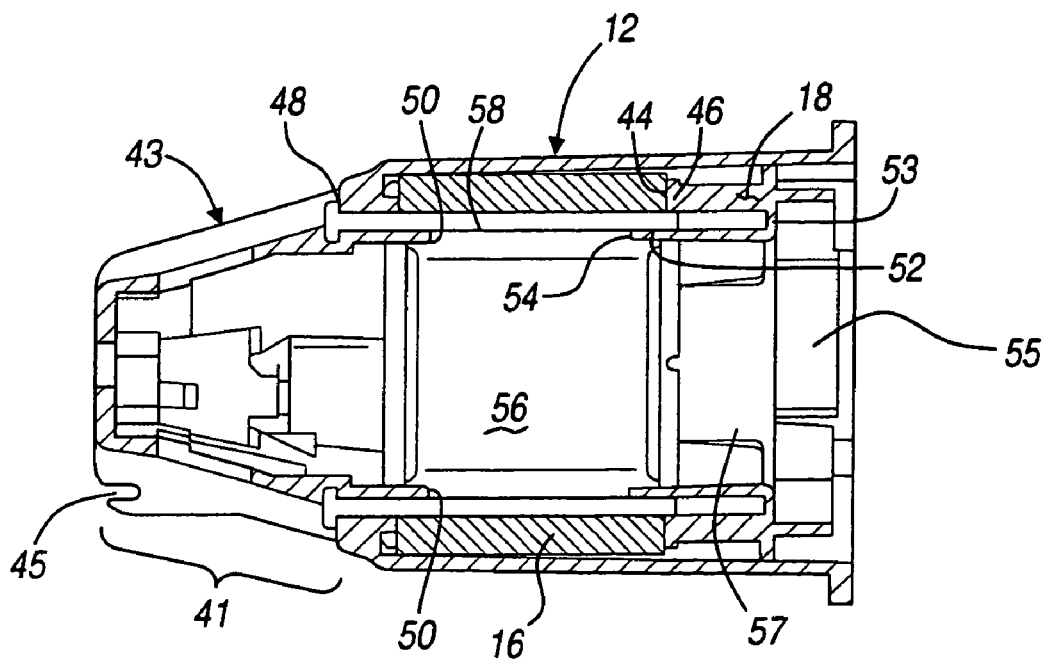
FIG. 3 is a cross-sectional view similar to FIG. 2, but including additional components of the field case housing subassembly.

Referring to FIG. 3, housing 12, motor can 16, and fan baffle 18 are illustrated assembled together. Notches 44 in motor can 16 cooperate with tabs 46 extending from fan baffle 18 to align these two components together (seen best in FIG. 1). This also serves to align baffle 18 with housing 12, since motor can 16 and housing 12 are aligned as a result of the alignment rib 40 and cooperating recess 42. Housing 12 includes two screw insertion apertures 48 associated with cylindrical guide member 50 which cooperate with corresponding screw receiving apertures 52 associated with conical guide members 54 of fan baffle 18.

Preferably, each screw insertion aperture 48 of housing 12 includes an elongated cylindrical segment 50 operating as a cylindrical guide member. In addition, each screw receiving aperture 52 of baffle 18 preferably includes a conical segment 54 at its receiving end operating as a conical guide member, thereby providing an enlarged diameter opening at the outer origin of aperture 52. The elongated cylindrical segment 50 is adapted to guide a tip of screw 58 passing therethrough and into the conical segment 54, even when motor can 16 is magnetized by magnets 56. Similarly, the diameter and slope of the conical segment 54 is adapted to receive a distal end of screw 58 passing through the screw insertion aperture 48 and guide it down into the screw receiving aperture 52, even when motor can 18 is magnetized. Preferably, the diameter of the conical segment at its outer end is at least about two times the diameter of the insertion aperture 48; and more preferably, at least about 2.5 times the diameter of the insertion aperture 48.

With continuing reference to FIG. 3, both of the cylindrical guide members 50 and the conical guide members 54 have a segment that extends away from the wall of the corresponding part (housing 12 and baffle 18, respectively). In addition, each of these extending segments is a partial cylindrical wall segment that is bound on one side by the inner surface of motor can 16. Thus, these extension segments cooperate with the inner surface of motor can 16 to guide and receive screw 58 as discussed above. In addition, the receiving screw aperture 52 is adapted to provide a portion into which the threads of screw 58 self-tap.

In addition to conical guide member 54 and its associated screw receiving aperture 52, baffle 18 includes a transverse wall 53 with an aperture 55 therethrough. In addition, two opposing guide walls 57, each aligned with one of the oppositely disposed magnets 56, extend at a ninety degree angle from transverse wall 53 adjacent aperture 55. Guide walls 57 are adapted to guide armature 20 past motor magnet 56 assembly without contacting and damaging the motor magnet 56 assembly. Guide walls 57 preferably extend an axial length which is at least about 65 percent of the distance from transverse wall 53 to an edge of the magnet 56 assembly; and more preferably, at least about 75 percent. It is also preferred that guide walls 57 be adapted to prevent an axis of armature 20 from deviating by more than about three degrees from the final position of armature 20 axis; and even more preferably, prevent from deviating by more than about two degrees. Additionally, guide walls 57 and aperture 55, in combination with the conical inner surface of end segment 41 of field case housing 12, is adapted to prevent any part of armature 20 from extending transversely toward a magnet 56 a distance about equal to or greater than the transverse distance between guide wall 57 and magnet 56. These guide walls are adjacent the aperture along less than about 65 percent of the circumference of the aperture; and more preferably, less than about 50 percent of the circumference aperture. Thus, air passages are left between the guide walls permitting air to pass to the fan.

Field case housing 12, motor can 16, and baffle 18 are assembled together as a field case housing sub-assembly using screws 58. Motor can 16 includes a metal cylinder made using a powder metal process or using a stamping or machining process. A motor magnet assembly includes motor can 16 and two opposing magnets 56 adhesively mounted on the inner surface of motor can 16 with spaces therebetween. Motor can 16 has an alignment recess 42 in its outer wall which cooperates with the alignment rib 40 on the inner surface 38 of field case housing 12. Motor can 16 is rotably oriented by aligning the alignment rib 40 with the recess 42. Then motor can 16 is press-fit into field case housing 12 where it is frictionally held due to the tight fit between the arcuate ribs 36 and the outer surface of motor can 16.

Baffle 18 is then rotably oriented by aligning notches 44 in the end of motor can 16 with protrusions 46 of baffle 18. This also appropriately aligns the two screw insertion apertures 48 with the corresponding screw receiving apertures 52. Screws 58 are passed through the cylindrical guide members 50 toward the conical guide members 54 and the distal end of the screw 58 is prevented from moving outside the diameter of the receiving end of the conical segment 54 as discussed above. Screws 58 are guided to the base of the conical segment 54 and into the smaller diameter segment of the screw receiving aperture 52 where the threads of the screw 58 are driven into the surrounding material.

Figure 4:
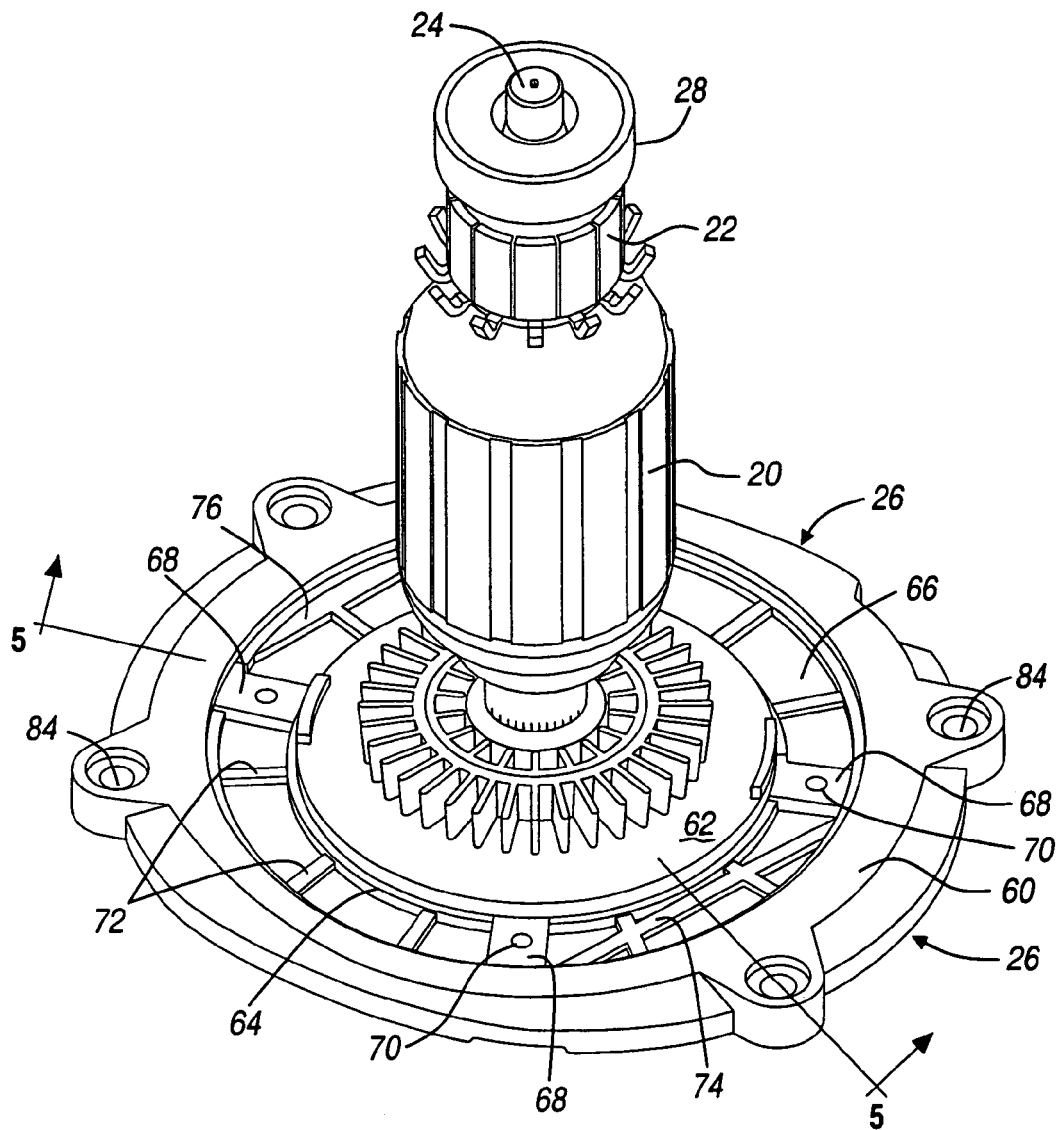
FIG. 4 is a perspective view of the cover plate subassembly.
Figure 5:
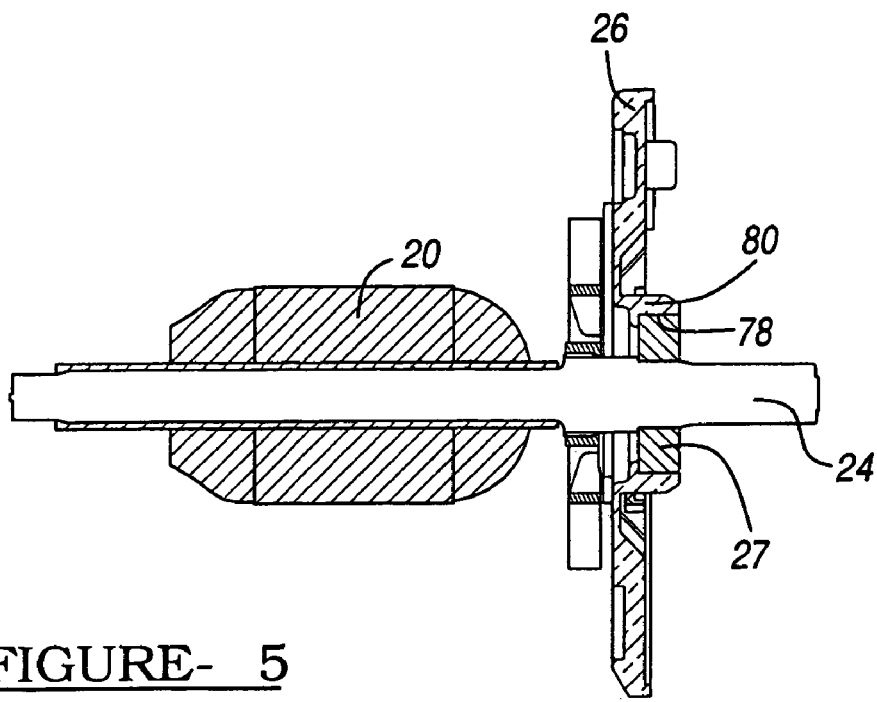
FIG. 5 is a cross sectional view taken along line 5—5 of FIG. 4.

Referring to FIG. 4 and FIG. 5, end plate 26 has an outer raised ring 60 and an inner raised ring 62. Inner ring 62 includes a precisely machined edge 64 that cooperates with the ends of the arcuate ribs 36 to accurately align end plate 26 and housing 12 together. Rings 60, 62 are connected to each other by a web 66 having four unequally spaced attachment bosses 68 associated with corresponding screw apertures 70. The surface of the bosses 68 are also precisely machined to aid alignment of field case housing 12 and end plate 26 together.

Web 66 has a plurality of raised reinforcing ribs 72 on its surface. Many of the reinforcing ribs 72 run radially between inner raised ring 62 and outer raised ring 60. Two of the ribs 74, 76 run in a generally tangential direction, one is a longer, elongated, linear rib 74 and the other is a shorter, elongated, linear rib 76. In addition to providing a reinforcing function, these elongated ribs 74, 76 provide visual indicia as discussed below. In providing this visual alignment function, these elongated ribs 74, 76 preferably extend along a distance of at least about 1.25 centimeters; and more preferably at least about 2.5 centimeters. Reinforcing bosses 68 additionally reinforce web 66 around various screw apertures 70 which operate as attachment features. Each of these elements 64, 68, have a top surface in the same plane upon which the outer surface of flange 30 may rest when assembled to cover plate 26.

An end plate sub-assembly is assembled as seen in FIGS. 4 and 5. Rear bearing 28 is press fit onto the rear end of the motor shaft 24 and the front bearing 27 is press fit into a machined recess 78 surrounded by a cylindrical wall 80 in the front side of end plate 26. Front bearing 27 is also press-fit onto the front end of the motor shaft 24. The press-fit arrangements operate to frictionally hold these components together as a sub-assembly during manufacturing.

Figure 6:
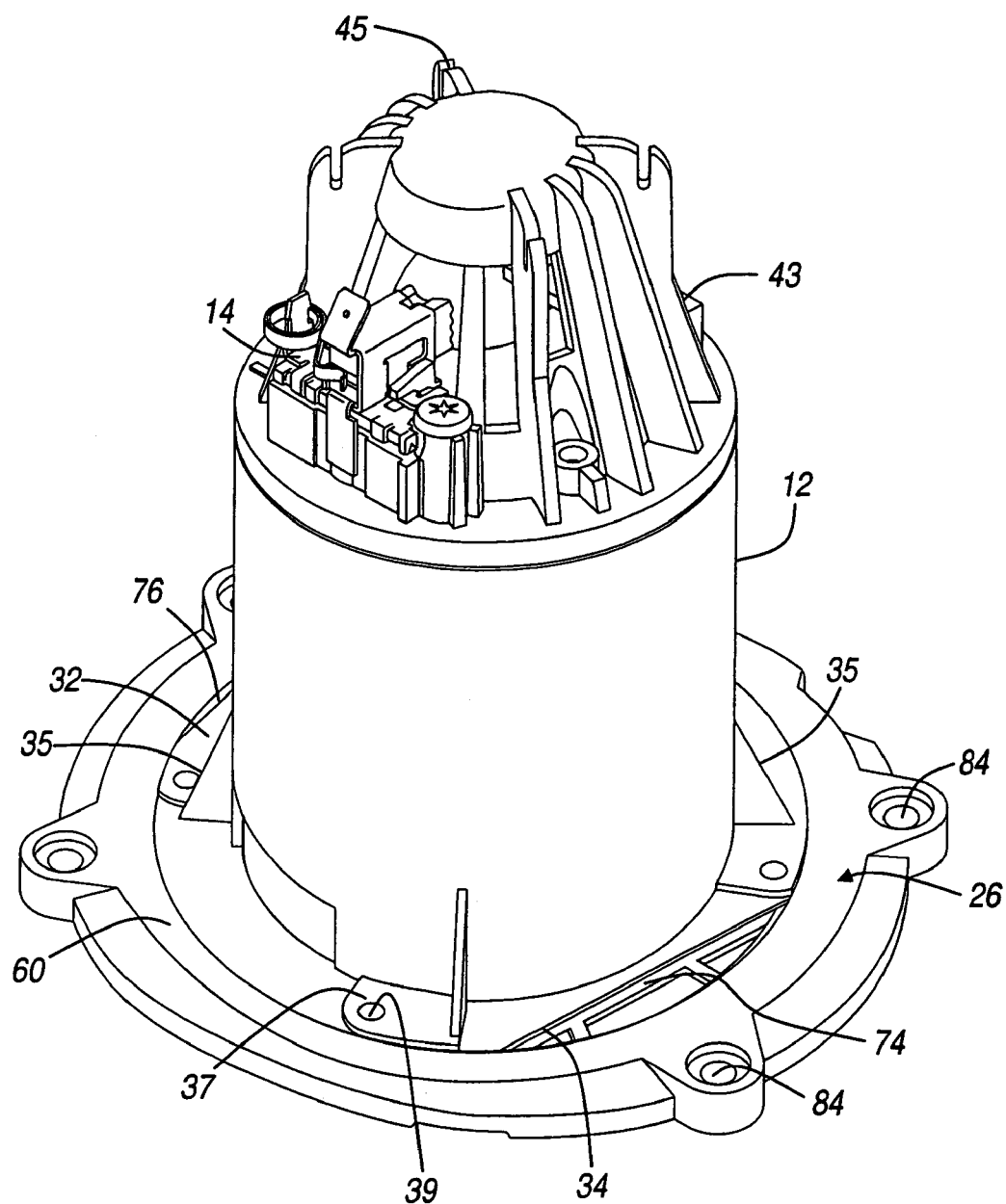
FIG. 6 is a perspective view similar to FIG. 4, showing the field housing subassembly and cover plate subassembly assembled together.

Referring to FIG. 6, the field case housing subassembly and the end plate subassembly are next assembled together. Housing 12 is illustrated in a radially aligned position against end plate 26. The long elongated member 74 and the short elongated member 76 operate to provide indicia capable of enabling proper rotary orientation of the parts 12, 26 relative to each other using solely the visual indicia. Elongated members 74, 76 are visually aligned with the flat spots 34 and 32, respectively, of flange 30. Thus, the subassemblies can be simply and easily aligned to each other without the disadvantages associated with mechanically interacting alignment features.

It is preferred that the visual indicia be formed into a surface of end plate 26 as illustrated. The term "visual alignment member," as used herein, however, includes, for example, printed markings or component edges. Cooperating alignment members, however, excludes merely aligning two external edges of components together, particularly if the edges are not elongated. The visual indicia is accurate enough to align apertures 39 in flange 30 with cooperating apertures 70 in cover plate 26. Thus, based upon the visual alignment, a screw (not shown) may be passed through each set of aligned apertures 39, 70 to attach housing 12 and cover plate 26 together.

Figure 7:
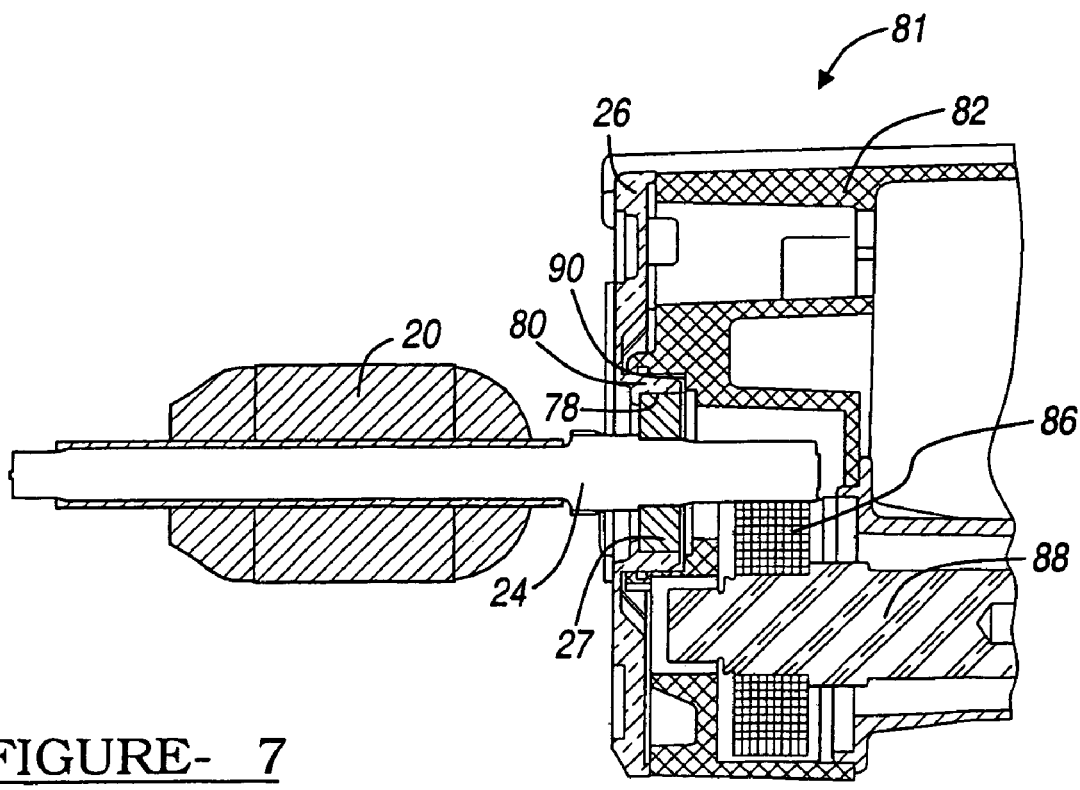
FIG. 7, is a partial cross sectional diagrammatic view of the cover plate assembled to a tool.

Referring to FIG. 7, the assembled motor 10 (represented by the shaft 24 and armature 20) is illustrated as part of a tool 81. The tool includes a mating housing 82 which is attached to cover plate 26 using screws (not shown) through the outer set of apertures 84. The complete details of tool 81 and its components are not discussed herein as they are familiar to those skilled in the art. In general, motor shaft 24 rotates a gear 86 which in turn, rotates a tool shaft 88 which is used to perform work on a workpiece. More importantly, the mating housing 82 of tool 81 includes a bearing retention shoulder 90 which operates to retain the front bearing 27 in place. The location of the front bearing 27 between cover plate 26 and tool mating housing 82 is preferred for several reasons. For example, this location stabilizes motor shaft 24 close to tool gear 86, reducing noise. Additionally, by trapping bearing 27 between cover plate 26 of motor 10 and mating housing 82 of tool 81, no additional parts or machining is required (e.g., such as when a locking ring is used). Tool 81 may be, for example, a drill, a reciprocating or circular saw, or some other tool.

Figure 8:
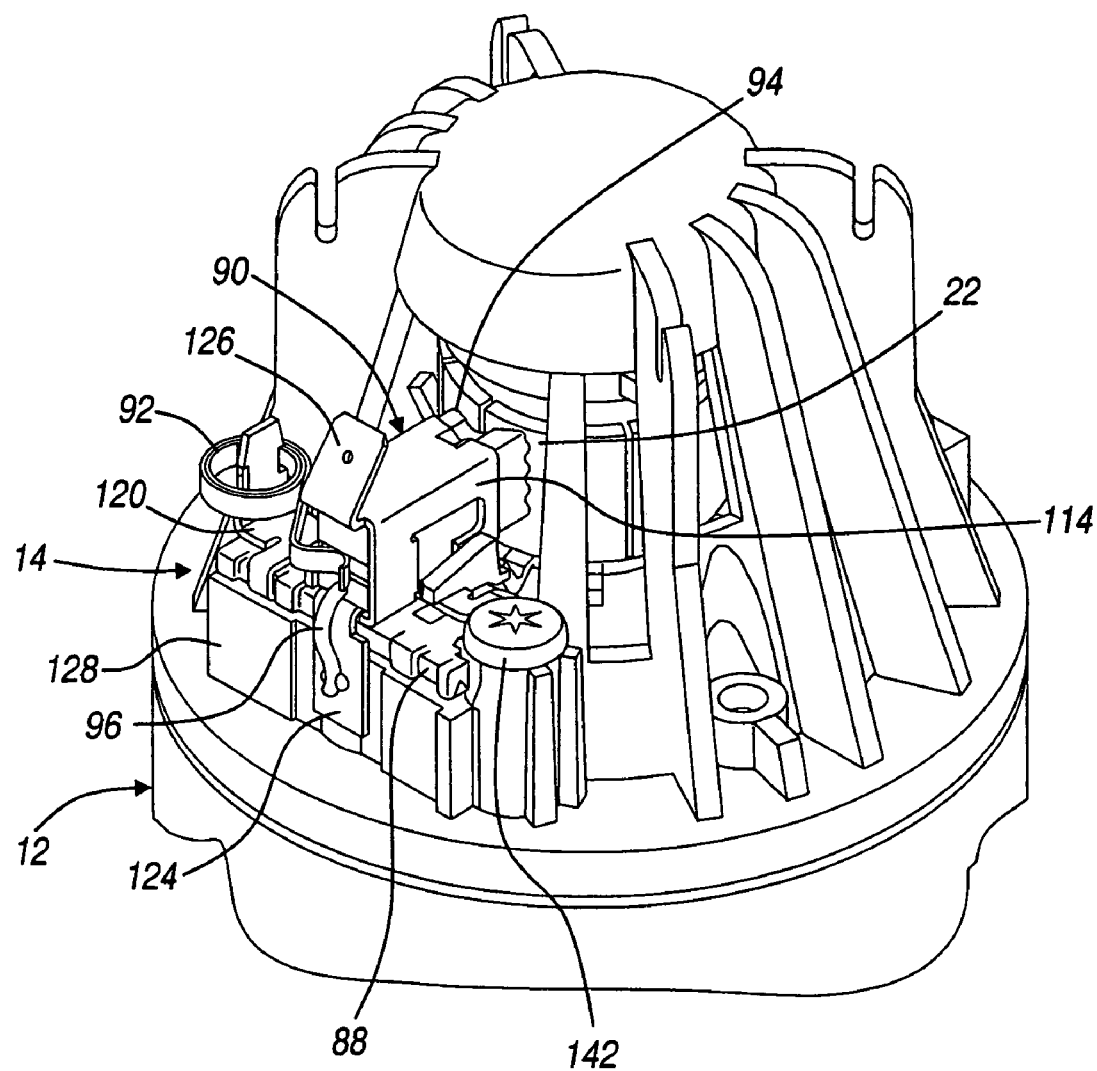
FIG. 8 is a fragmentary perspective view of the field case housing with the brush assembly attached thereto.

Referring to FIG. 8, brush assemblies 14 are attached to the motor 10 to enable selectively providing electrical power to the motor 10. Brush assembly 14 includes a base 88, a brush box 90, a spring 92, a brush 94 and an electrical connector 96. Base 88 is preferably formed of a non-metallic or non-electrically conductive material; more preferably, the material is a high melting temperature thermoplastic plastic or thermoset material; more preferably, the material is selected from the group of high temperature nylons, polyphenolyne sulfide (PPS) and polyphthalamide; and even more preferably, the material is polyphthalamide. In addition, the high melting temperature plastic preferably has a melting point above about 280° C.; and more preferably, above about 310° C.

Figure 9:
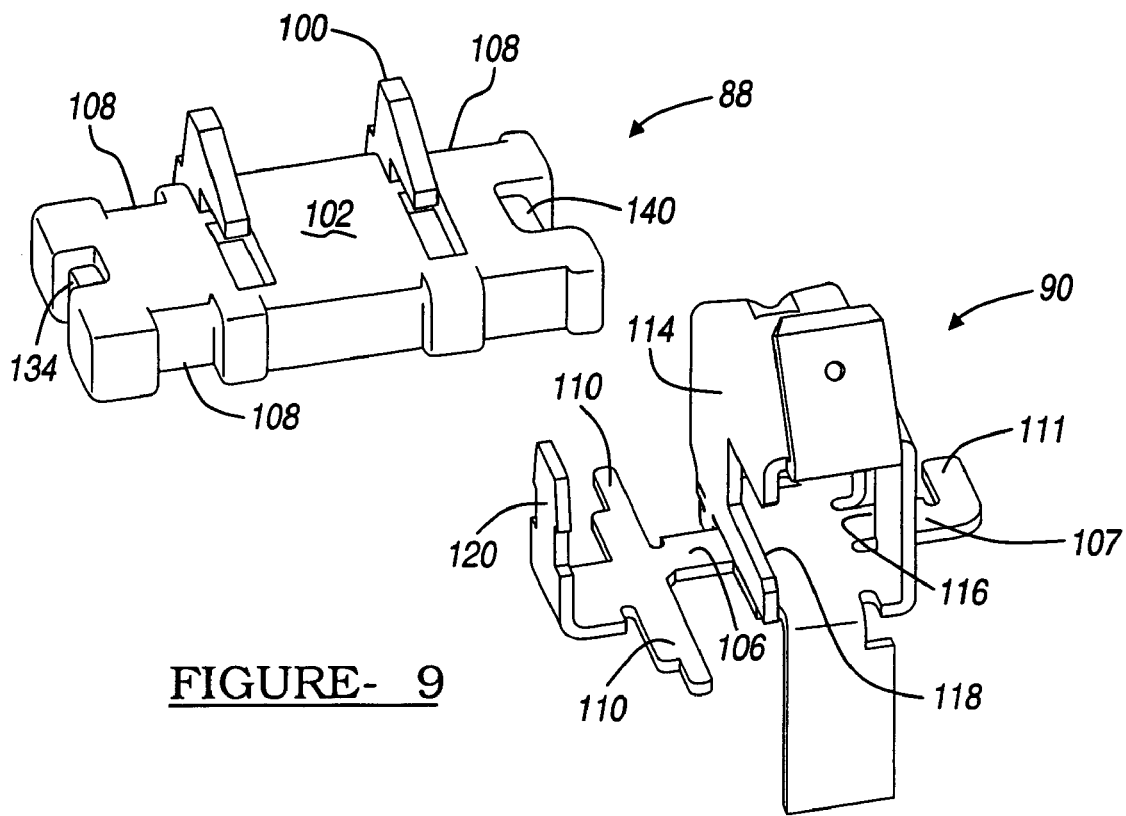
FIG. 9 is an expanded plan view of a preferred brush assembly.
Figure 10:
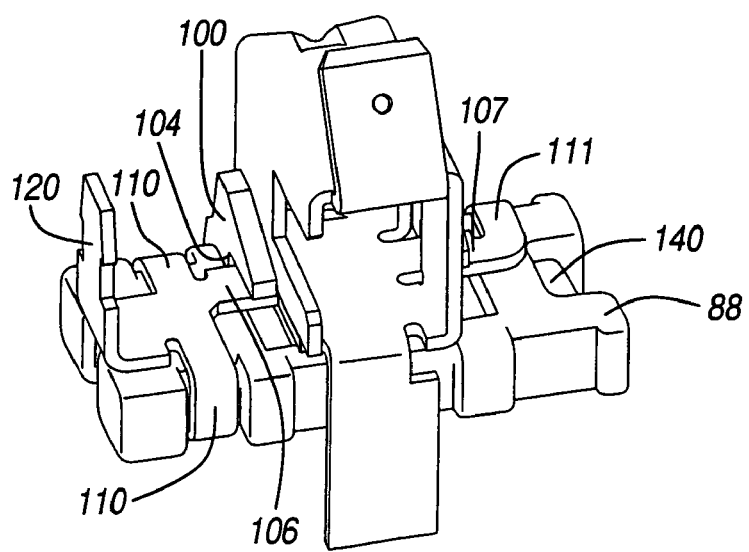
FIG. 10 is a perspective view of the assembled brush assembly of FIG. 9.
Figure 11:
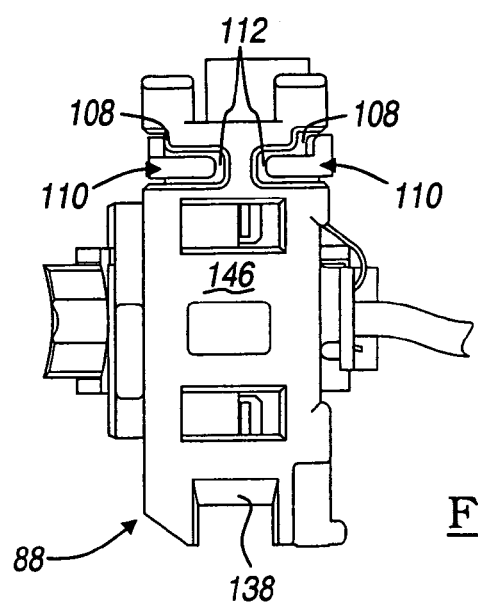
FIG. 11 is a bottom plan view of the assembled brush assembly of FIG. 10.

Referring to FIGS. 9, 10 and 11, base 88 is a generally planar element with retention members used to attach the brush box 90 to base 88. The brush box retention members include two arms 100 which form slots 104 between themselves and the upper surface 102 of base 88. Slots 104 are adapted to receive opposing arms 106, 107 of brush box 90. Base 88 retention members also include several recesses 108 to accommodate crimping tabs 110 of brush box 90, as discussed hereinafter. Two of the recesses 108 include surfaces 112 which are oppositely disposed in relation to upper surface 102 of base 88. Oppositely disposed surfaces 112 are preferably parallel to the upper surface. Oppositely disposed surfaces 112 provide a surface against which crimping tabs 110 may press with a vector force component that is perpendicular to upper surface 102.

Brush box 90 includes an open, tubular housing 114 with a rectangular cross-section. Brush box 90 is formed from a flat sheet of brass material stamped into the correct shape and then folded to form brush box 90. Brush box 90 has two opposing arms 106, 107, one extending from each side of housing 114. One of the two arms 107 and its associated crimping tab 111 is formed from material of a side wall of housing 114; thereby creating an opening 116 in the side wall. It is preferred that at least one of the crimping tabs 111 is formed from material cut from a side wall of the housing 114.

The other side wall of the housing 114 includes a slot 118 for accommodating the biasing member or spring 92. This opposing arm 106 includes two crimping tabs 110 and a spring support member 120. Crimping tabs 110 are located between the side wall with slot 118 and spring support member 120 and adjacent thereto. This location provides added stabilization to spring support member 120. Crimping tabs 110 are sufficiently long to reach around and rest against respective oppositely disposed surfaces 112.

Assembly of brush box 90 to base 88 involves first sliding the opposing arms 106, 107 into slots 104 under cooperating arms 100 of base 88. Each crimping tab 110, 111 is crimped against base 88. Two crimping tabs 110 adjacent spring support member 120 are crimped against surfaces 112 located in recesses 108. Surface 112 is oppositely disposed to the upper surface. Crimping tab 111 of the other opposing arm 107 is crimped against a surface adjacent upper surface 102. This adjacent surface is also located in a recess 108.

Returning to FIG. 8, brush 94 is located within housing 114. Brush 94 includes an electrical shunt 96 or connector extending from a recess in brush 94 to an electrical contact tab 124 to which it is welded or otherwise connected to provide electrical contact between brush 94 and brush box 90. After assembly to field case housing 12 as discussed below, an electrical connector (not shown) is attached to the electrical connector tab 126 to provide power from an electrical power source to and through brush box 90 to brush 94. A spring 92 is wound around the biasing member support 120 adapted to bias a face of brush 94 which is arcuate and has a series of ribs against commutator 22.

Figure 12:
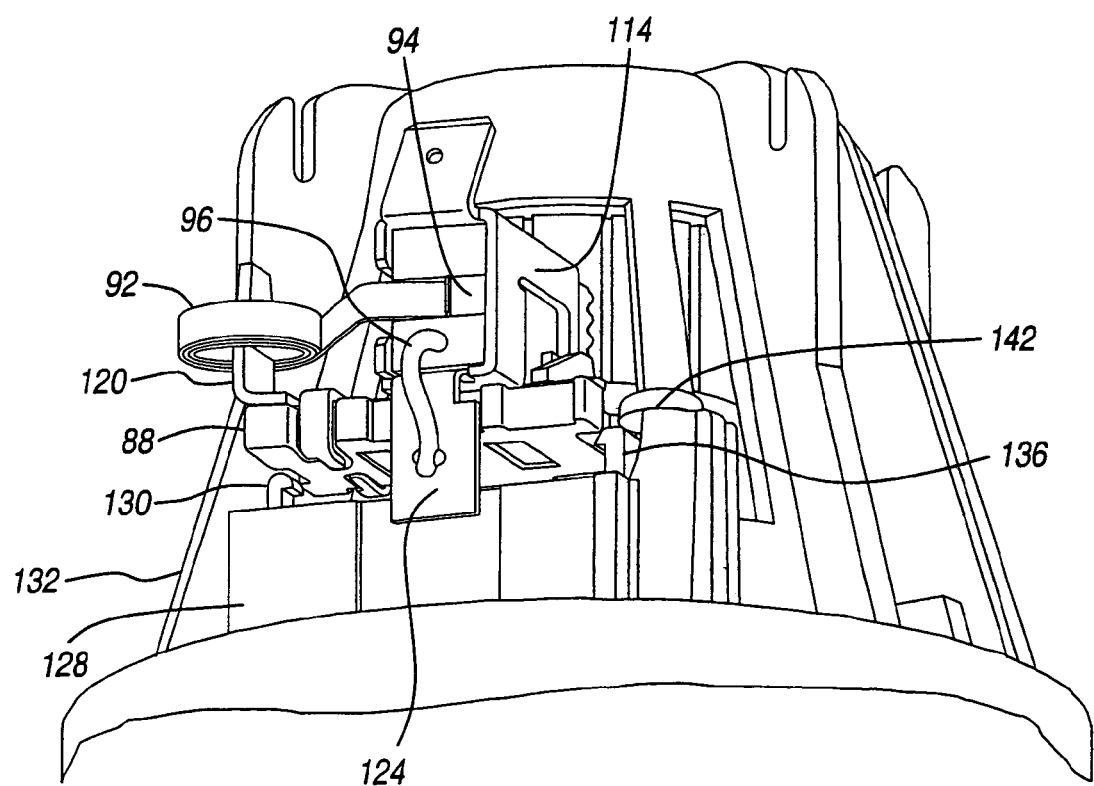
FIG. 12 is a perspective view showing the brush assembly being attached to the field case housing.

Referring to FIG. 12, in addition to the brush box retention members 100 and 108, base 88 includes retention members which, in connection with cooperating retention members on field case housing 12, attach base 88 (and thus, brush assembly 14) to field case housing 12. Field case housing 12 includes a seat 128 for brush assembly 14. Seat 128 includes a retention member in the form of a retaining hook 130. Hook 130 provides a surface 132 or lip under which a cooperating portion of base 88 is retained. The cooperating portion of base 88 includes the ledge 134 (seen best in FIG. 9). Seat 128 also includes a snap lock 136 as a second retention member also having a hook shape. After sliding the ledge 134 under the retaining hook 130, the assembly 14 is rotated downwardly. The snap-lock 136 is forced outwardly by the angled surface 138 (seen in FIG. 11) of base 88 until it passes angled surface 138 and latches against a cooperating portion of base 88. The cooperating portion in this case is ledge 140 (seen in FIG. 9). Thus, retention features 134 and 140 on base 88 cooperate with retention features 130 and 136, respectively, on field case housing 12 to attach brush assembly 14 to the seat of field case housing 12.

As an alternative to or in addition to the snap-lock member 136, a screw 142 may be provided in association with housing seat 128. Screw 142 is rotated into a recess of housing 12 until the head of screw 142 presses against a cooperating portion of brush assembly 14. Preferably, screw 142 does not come into contact with brass portions 90 of brush assembly 14. By avoiding such contact, potentially damaging heat does not pass through the screw 142 and into field case housing 12.

Similarly, crimping tabs 110 are preferably located a distance away from field case housing 12 by a spacer member. The spacer member is adapted to space crimping tabs 110 away from field case housing 12. As illustrated, the spacer member is the bottom surface 146 of base 88 which is spaced away from crimping surface 112 and located against seat 128 of field case housing 12. This is accomplished by locating crimping surface 112 within a recess 108 of base 88 away from bottom surface 146. Thus, the lower temperature thermoplastic material of housing 12 does not contact the heated metal of brush box 90. Of course, many alternative spacer members are possible. For example, housing 12 may include protrusions that extend up to base member 88 in areas away from crimping tabs 110, 111, or a completely separate component may be provided between base member 88 and housing 12, which may be heat resistant.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric motor assembly comprising:
   (a) a field case housing having:
      (i) a substantially cylindrical wall segment having a substantially constant wall thickness;

(ii) an end segment including a motor brush seat receiving a base member of a motor brush assembly, and the end segment having a thickness which is substantially the same as the substantially constant wall thickness of the wall segment;

(iii) a flange around an open end of the housing, at least a portion of the flange having a thickness which is substantially the same as the substantially constant wall thickness of the wall segment; and (b) an end plate adapted to cover the open end of the housing attached to the flange;

wherein the end segment, the wall segment and the flange are formed as a single, integral part and wherein the thicknesses are adapted to reduce warping of the housing as a result of a molding process.

2. An electric motor assembly according to claim 1, wherein the field case housing further comprises an elongate guide member associated with a screw insertion aperture or an additional elongate guide member associated with a screw receiving aperture, the additional elongate guide member having an opening at its distal end with a diameter which is larger than a diameter of the screw insertion aperture, and wherein the electric motor assembly further comprises an additional component having the other of the elongate guide member or the additional elongate guide member, the elongate guide member being adapted to cause a tip of a screw passing through the elongate guide member to be guided to a point within the opening of the additional elongate guide member.

3. An electric motor assembly according to claim 2, wherein the additional component is a fan baffle.

4. An electric motor assembly according to claim 2, wherein the additional component further comprises a transverse wall with an aperture therethrough and at least one guide wall extending from the transverse wall adjacent the aperture, the at least one guide wall being adapted to guide the armature past a motor magnet assembly without contacting and damaging the motor magnet assembly.

5. An electric motor assembly according to claim 4, wherein the additional component is a fan baffle.

6. An electric motor assembly according to claim 1, wherein the flange further comprises a plurality of flange reinforcing ribs connected to the wall segment having a thickness which corresponds to about 75% of the substantially constant wall thickness.

7. An electric motor assembly according to claim 1, wherein the end plate has a bearing retention shoulder adapted to cooperate with a tool component to retain a bearing.

8. An electric motor assembly according to claim 1, wherein the substantially cylindrical wall segment has an internal wall surface with a plurality of arcuate locating ribs adapted to accurately locate another motor component within the housing, the arcuate locating ribs creating a wall thickness of the wall segment which is less than about two times the substantially constant wall thickness.

9. An electric motor assembly according to claim 6, wherein the plurality of flange reinforcing ribs, are substantially radially aligned.

10. An electric motor assembly according to claim 1, wherein the end segment further comprises a plurality of end segment reinforcing ribs having a wall thickness which corresponds to about 75% of the substantially constant wall thickness.

11. An electric motor assembly comprising:
an elongate guide member associated with a screw insertion aperture having a diameter and located in a field case motor housing or a separate motor component;
an additional elongate guide member associated with a screw receiving aperture in the other of the field case housing or the separate motor component, the elongate guide member having an aperture at a distal end which is larger than a diameter of the screw insertion aperture;
at least one magnet located between the elongate guide member and the additional elongate guide member which exerts a magnetic force on a screw passing from the elongate guide member to the additional elongate guide member;
wherein the elongate guide member is adapted to insure a tip of a screw passing through the elongate guide member is guided to a point within the aperture at the distal end of the additional elongate guide member; and wherein said screw joins the field case housing and the separate motor component together to thereby retain the magnet in a fixed position therebetween.

12. An electric motor assembly according to claim 11, wherein a diameter of the aperture at the distal end of the additional elongate guide member is at least about 2.5 times the diameter of the screw insertion aperture.

13. An electric motor assembly according to claim 11, wherein the diameter of the aperture at the distal end of the additional elongate guide member is at least about two times the diameter of the screw insertion aperture.

14. An electric motor assembly according to claim 11, wherein the elongate guide member or the additional elongate guide member has a segment which extends outwardly away from an adjacent wall.

15. An electric motor assembly according to claim 11, wherein the at least one magnet is attached to a substantially cylindrical motor can, and wherein an adjacent segment of the motor can cooperates with the elongate guide member, the additional elongate guide member, or both in guiding the screw.

16. An electric motor assembly according to claim 11, wherein the at least one magnet is attached to a substantially cylindrical motor can having a housing alignment member adapted to cooperate with an alignment member on the housing to rotably align the motor can with the housing and a separate motor component alignment member adapted to cooperate with an alignment member of the separate motor component to rotably align the motor can with the separate motor component to thereby align the elongate guide member with the additional elongate guide member.

17. An electric motor assembly according to claim 11, wherein the at least one magnet is attached to a substantially cylindrical motor can and wherein the housing further comprises an internal wall surface with a plurality of arcuate locating ribs adapting to accurately locate the motor can within the housing.

18. An electric motor assembly according to claim 11, wherein the separate motor component further comprises a transverse wall with an aperture therethrough and at least one guide wall extending from the transverse wall adjacent the aperture, the at least one guide wall being adapted to guide the armature past a motor magnet assembly without contacting and damaging the at least one magnet.

19. An electric motor assembly according to claim 11, wherein the field case housing further compriss a substantially cylindrical wall segment having a substantially constant wall thickness and a flange around an open end of the housing having a thickness which is substantially the same as the substantially constant wall thickness of the wall segment, the flange having a plurality of flange reinforcing ribs connected to the wall segment, and the flange having a plurality of apertures with reinforcing bosses around the plurality of apertures, wherein the housing is formed as a single, integral part and wherein the plurality of flange reinforcing ribs and the substantially constant thicknesses are adapted to reduce warping of the housing as a result of a molding process.

20. An electric motor assembly according to claim 19, wherein the plurality of flange reinforcing ribs have a thickness which is about 75% of the substantially constant wall thickness.

* * * * *

UNITED STATES PATENT AND TRADEMARK OFFICE
CERTIFICATE OF CORRECTION

| | | |
|---|---|---|
| PATENT NO. | : 7,126,242 B2 | Page 1 of 1 |
| APPLICATION NO. | : 11/118918 | |
| DATED | : October 24, 2006 | |
| INVENTOR(S) | : Robert B. Williams et al. | |

It is certified that error appears in the above-identified patent and that said Letters Patent is hereby corrected as shown below:

Column 10,
Line 54, after "accurately" insert -- radially --.
Line 64, "compriss" should be -- comprises --.

Signed and Sealed this

Tenth Day of April, 2007

JON W. DUDAS
*Director of the United States Patent and Trademark Office*